Sept. 16, 1958 L. G. PENDER 2,851,757
FASTENING DEVICE
Filed Aug. 29, 1955
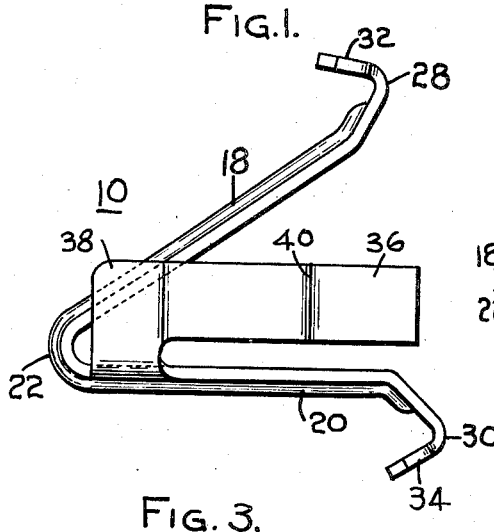
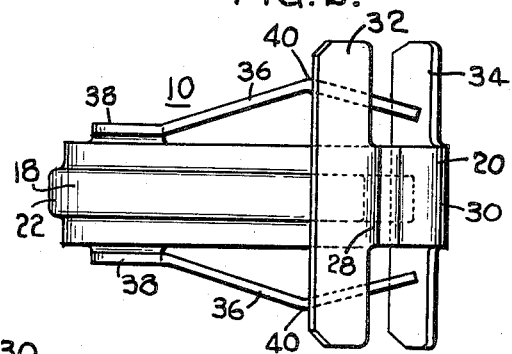
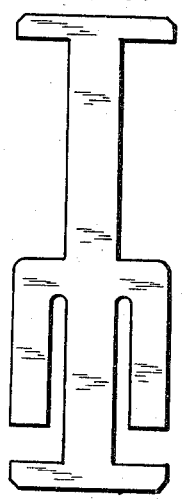
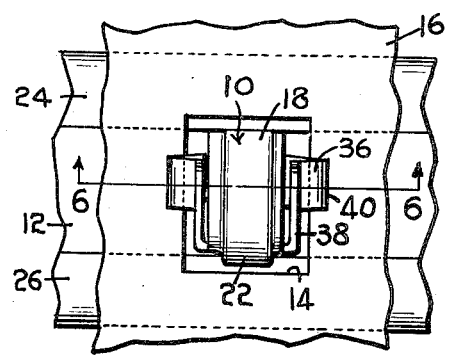
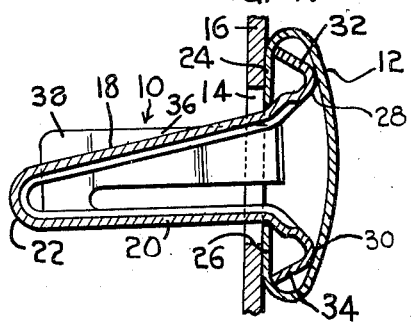
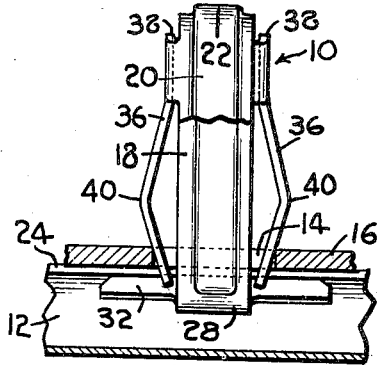
INVENTOR:
LLOYD G. PENDER,
BY Robert E. Ross
ATTORNEY.

United States Patent Office 2,851,757
Patented Sept. 16, 1958

2,851,757
FASTENING DEVICE

Lloyd G. Pender, Detroit, Mich., assignor to United-Carr Fastener Corporation, Boston, Mass., a corporation of Delaware Application August 29, 1955, Serial No. 530,984

2 Claims. (Cl. 24—213)

This invention relates generally to fastening devices and has particular reference to a fastener for securing a channeled trim molding to an apertured panel.

In the construction of automobiles, home appliances and the like it is frequently necessary to attach a trim molding to a panel in situations where there is no access to the opposite side of the panel. In such cases the fastener that attaches the molding to the panel must be adapted to snap into engagement in a panel aperture from the front of the panel, and such snap action should be substantially independent of the means by which the fastener engages the molding. Such a fastener should also be adapted for manufacture from a minimum amount of material.

The object of the invention is to provide a fastening device formed of a minimum amount of material which is adapted for assembly with a channeled molding and for snapping engagement into a panel aperture.

A further object of the invention is to provide a molding fastener having a pair of spring arms adapted for engagement with a panel aperture in which one of said arms is provided with snap fastener means for engagement in a panel opening.

Other objects of the invention will, in part, be obvious, and will, in part, appear hereinafter.

In the drawing:

Fig. 1 is a view in side elevation of a fastening device embodying the features of the invention;

Fig. 2 is a top plan view of the fastener of Fig. 1;

Fig. 3 is a view showing the shape of the blank from which the fastener of Fig. 1 is formed;

Fig. 4 is a view in section of the fastener of Fig. 1 assembled with a molding and attached to a panel;

Fig. 5 is a view of the assembly of Fig. 4 as seen from the left side; and

Fig. 6 is a view in section taken on line 6—6 of Fig. 5.

Referring to the drawing there is illustrated a fastening device 10 which is adapted for assembly with a channeled molding 12 and for snapping engagement into an aperture 14 in a support panel 16.

The fastener 10 comprises generally a pair of spring arms 18 and 20 which are joined at one end by a bight portion 22 and are flexible toward and away from each other. The arms 18 and 20 are provided with means on the free ends for engagement with the opposite inturned edges 24 and 26 of the molding 12, and in the illustrated embodiment said means comprise reverse bend portions 28 and 30 having laterally extending wing portions 32 and 34 disposed thereon.

To provide means to enable the fastener to be snapped into engagement with the support panel, a pair of snap fastener legs 36 are disposed on the arm 20. In the illustrated embodiment the legs 36 have portions 38 which are joined to opposite side edges of the arm and extend generally perpendicular thereto past the side edges of the arm 18 and then extend generally parallel to said arm 20. The legs 36 have shoulders 40 which extend outwardly in a direction generally perpendicular to the plane of flexing of said arms for snapping engagement into the panel aperture.

The fastener is assembled with the molding by squeezing the arms 18 and 20 together so that the wing portions 32 and 34 can pass into the molding and seat in the recesses. As the arms are allowed to resile outwardly, the reverse bend portions seat against the face of the molding and the ends of the reverse bend portions seat against the inturned edges of the molding. The fastener may thereafter be snapped into a panel opening by a pushing force applied to the face of the molding.

As illustrated in Fig. 3, the shape of the fastener in which the snap fastener legs are attached to one of the molding-engaging arms enables the fastener to be made from a strip of material no wider than that required for the laterally extending portions on the ends of the arms, or if it is desired to blank across the strip, the presence of the snap fastener legs does not increase the station distance, hence no greater amount of material is required.

The extension of the portions 38 of the snap fastener past the edges of the other arm 18 confines the arm to prevent undesirable sideways flexing and also shields the arm 18 from contact with the edge of the panel aperture when the fastener is driven therein so that there is no tendency to loosen the engagement of the arm 18 with the molding. Hence, the action of the fastener in engaging the molding and the action in snapping engagement into the panel opening are substantially independent of each other so that the holding power of the fastener in the molding is not affected by the engagement in the aperture and vice-versa. For this reason the fastener has a considerable ability to adapt itself to various sizes of moldings and panel apertures.

Although in the illustrated embodiment the ends of the arms are provided with reverse bend portions with laterally extending wings, other shapes may be provided to conform to the shape of other types of moldings.

Since certain other obvious changes may be made in the scope of this invention, it is intended that all matter contained herein be interpreted in an illustrative and not in a limiting sense.

I claim:

1. A molding fastener, formed of an elongated flat strip of material bent to provide a pair of arms joined at a bight portion with generally flat sides facing each other, said arms having transversely extending portions on the ends and being flexible toward and away from each other for engagement of said transversely extending portions into the inturned edges of an elongated molding, one of said arms having a pair of snap fastener legs joined to side edges thereof in spaced relation to the bight portion, said legs extending in planes perpendicular to the plane of said one arm beyond side edges of the other arm and extending lengthwise away from the bight portion toward the transversely extending portions of said arms and having shoulders formed thereon and cooperating for snap fastening engagement of said legs into a panel opening.

2. A molding fastener comprising an elongated strip of material formed to provide a pair of arms joined by a bite portion, said arms being flexible toward and away from each other and having end portions adapted for engagement with opposite edges of a channeled molding, and a pair of snap fastener legs connected directly to one of said arms, said legs having portions joined to opposite side edges of said one arm in spaced relation to the bite portion, said legs extending in planes generally perpendicular to the plane of said one arm and beyond the side edges of the other arm and also extending generally parallel to the direction of said one arm and moveable toward and away from each other, said legs having shoulder portions formed thereon and cooperating for snapping engagement of said legs into a panel opening.

References Cited in the file of this patent

UNITED STATES PATENTS

| 2,178,719 | Cotter | Nov. 7, 1939 |
| 2,631,345 | Poupitch | Mar. 17, 1953 |
| 2,692,414 | Poupitch | Oct. 26, 1954 |